United States Patent
Turney

(10) Patent No.: US 6,708,782 B1
(45) Date of Patent: Mar. 23, 2004

(54) METHOD AND APPARATUS FOR AXIAL ALIGNMENT OF A MUD MOTOR'S ADJUSTABLE HOUSING RELATIVE TO THE ORIENTATION SUB'S INTERNAL SLEEVE IN A DRILL STRING

(76) Inventor: James Turney, 214 Ernest St., Duson, LA (US) 70529

( * ) Notice: Subject to any disclaimer, the term of this patent is extended or adjusted under 35 U.S.C. 154(b) by 0 days.

(21) Appl. No.: 10/211,816

(22) Filed: Aug. 2, 2002

(51) Int. Cl.⁷ .................. E21B 47/024; G01C 15/04
(52) U.S. Cl. ................. 175/40; 175/45; 33/286; 33/293
(58) Field of Search .............. 175/40, 45, 61, 175/220, 256, 325.1; 33/286, 293, 314, 412, 529; 356/138

(56) References Cited

U.S. PATENT DOCUMENTS 4,111,486 A * 9/1978 Kumaki et al. ............. 299/1
4,747,454 A    5/1988 Perryman
5,084,980 A * 2/1992 Skopec et al. ............. 33/286
5,361,854 A * 11/1994 Tull et al. ................. 175/45
5,881,824 A    3/1999 von Bynz Rekowski
6,261,348 B1   7/2001 Kwan et al.

FOREIGN PATENT DOCUMENTS

GB    2231357 A   * 11/1990   .......... E21B/17/07

* cited by examiner

*Primary Examiner*—David Bagnell
*Assistant Examiner*—Daniel Stephenson
(74) *Attorney, Agent, or Firm*—Robert N. Montgomery

(57) ABSTRACT

A laser alignment tool used in directional drilling operations for aligning, and marking the mule-shoe sub relative to the setting of an adjustable, bent housing, drilling motor assembly. A mark is produced as a result of a laser transmitter, located on the drill motor projecting a light beam upwards externally along the drill string, striking a photosensitive paper target or reflected onto a photosensitive paste or film located on the mule-shoe sub. The mark is then used as a reference point for orienting the internal keyed sleeve of the mule-shoe sub after the laser transmitter has been removed.

8 Claims, 3 Drawing Sheets

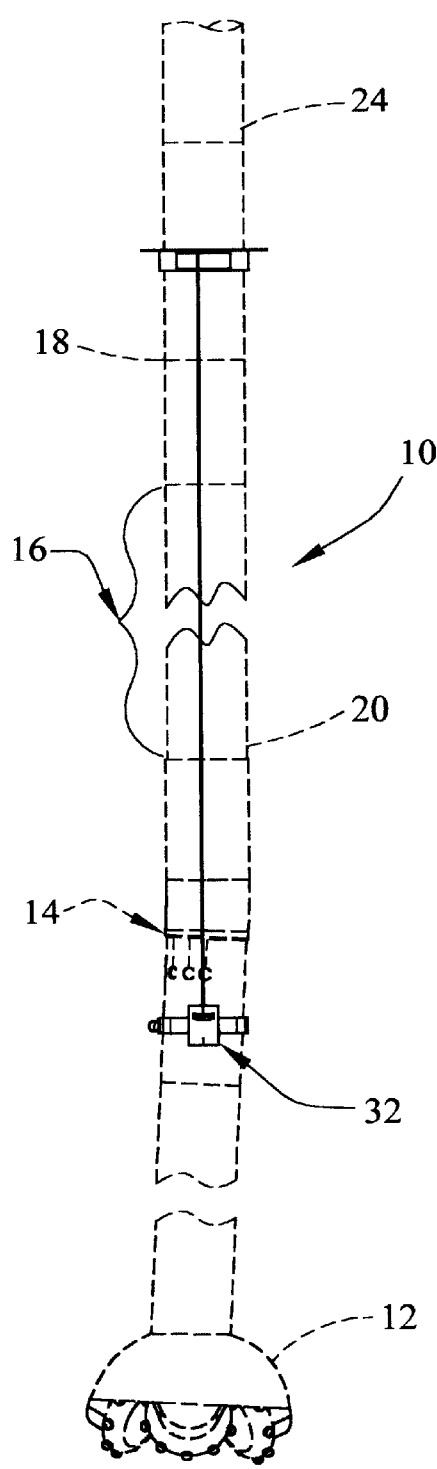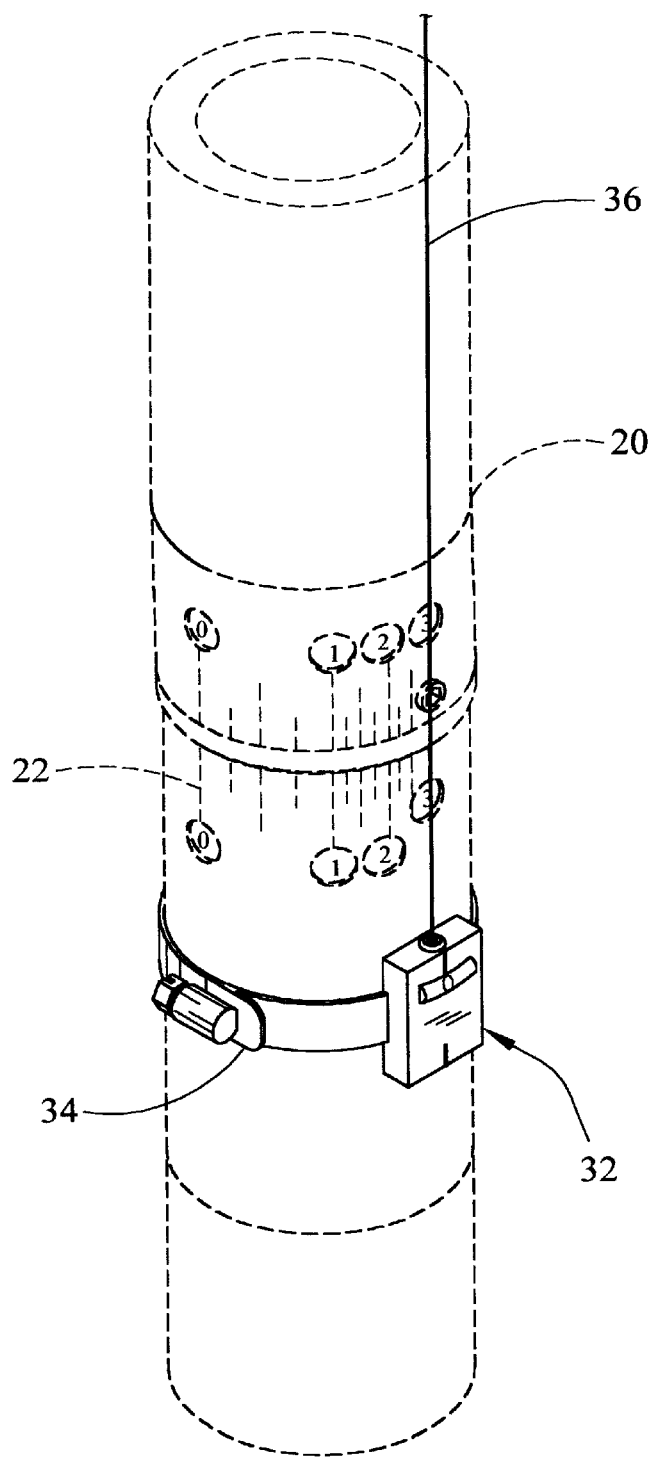
FIG. 1
FIG. 2

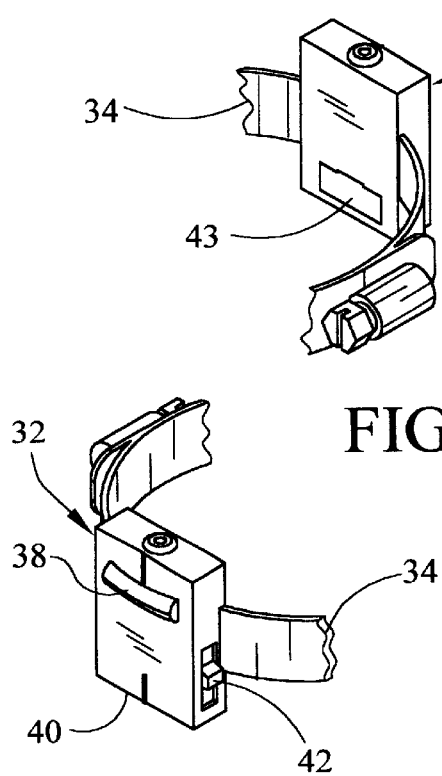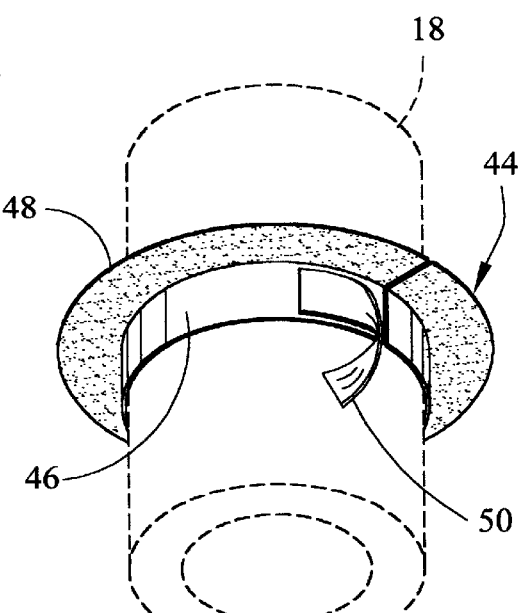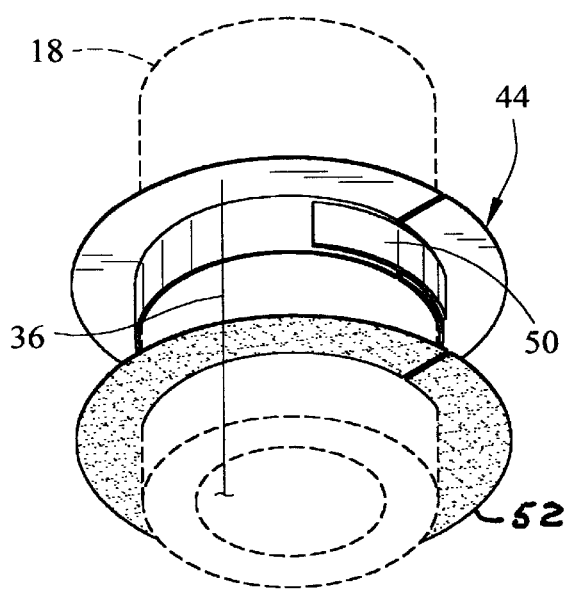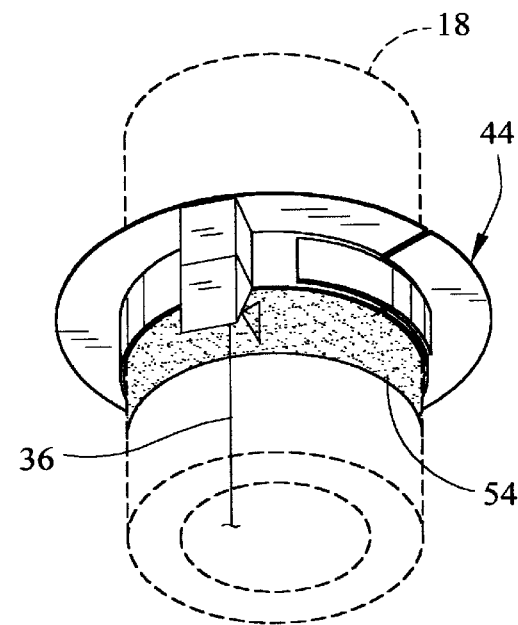

METHOD AND APPARATUS FOR AXIAL ALIGNMENT OF A MUD MOTOR'S ADJUSTABLE HOUSING RELATIVE TO THE ORIENTATION SUB'S INTERNAL SLEEVE IN A DRILL STRING

FIELD OF THE INVENTION

This invention relates generally to the use of a laser in aligning tubular assemblies and more particularly to laser alignment and marking of a Mule-shoe sub containing an orienting sleeve, relative to the mud-motor orientation in an oil and gas well directional drilling operation.

GENERAL BACKGROUND

Oil and gas well drilling operation often utilizes directional drilling technology whereby a drill string extends into a substantially vertical well bore and generally supports a hydraulically operated motor and drill bit at its lower end. Angular drilling is produced by using a bent sub or downhole motor with a bent housing. A directional measurement tool is generally connected above the drill or mud motor to provide a method of steering the drill string. An orienting sub is connected to the directional measurement tool for orienting the position of the directional measurement tool relative to the motor. The orienting sub is generally a tubular construction with a connection to the directional measurement tool at one end and a connection to the bent sub or the upper motor housing at the other end. The orienting sub has a sleeve mounted within the sub's bore containing an internal key utilized to receive a mule shoe for locating the directional measurement tool in relation to the drill motor. The directional measurement equipment, to which the mule shoe arrangement is connected, generally includes an axially extending slot that communicates at its lower end with a camming surface. A butting engagement of the key with the camming surface rotates the directional measurement assembly to permit the slot therein to receive the key. When the slot and key are fully engaged, the measurement equipment is accurately oriented with respect to the motor or bent sub so that it may accurately plot or record the orientation at which the key, and therefore the motor or bent sub, are disposed relative to a predetermined datum.

Orientation of the measuring or directional/logging equipment orientation sleeve located and locked inside the orienting sub, relative to the orienting sub and in alignment with the bent housing orientation of the drill motor, is achieved upon establishment of the bottom hole assembly. The directional drilling string assembly consists of a drill bit, an adjustable, bent housing, steerable drilling motor, a float sub, a crossover and/or stabilizer (if applicable), a mule shoe sub containing the above mentioned locked in orienting sleeve, and a non-magnetic drill collar used to house the directional/logging equipment.

At assembly of the directional drilling string, the directional driller sets the Drill Motor orientation to the prescribed bend, based on the drilling application for the well being drilled. Once the Drill Motor's bent housing orientation has been set, a scribe-line is marked externally on the motor housing and extended by a straight edge or by sight along the length of the string extending over several feet and crossing connecting joints to a point adjacent the orientating sleeve located inside the orientating sub. The orientation sleeve is then rotatably adjusted for alignment with the scribe line by using a hand tool configured to be inserted internally through the bore of the mule-shoe sub to engage a key located integral with the orientation sleeve. Since the orienting process must be repeated several times while drilling a deviated hole and the scribe lines are hard to see, especially at night, and originate at a point on the mud motor housing that is usually below the rig floor and submerged in mud when the orienting sleeve is being adjusted, it is very difficult, if not impossible, to maintain any degree of accurate alignment. Even an unrecognizable surface deviation in the scribe line resulting in only a minor difference between the logging measurement equipment orientation and the mud motor orientation produces a significant deviation in the subsurface course plan extending over several hundred feet. Such a deviation of only a few degrees either way can spell the difference between achieving an accurate well target location or ending with a dry hole. Therefore, there is a need for a more precise method of aligning and marking the mule shoe sub for orientation with the measuring and logging equipment alignment sleeve.

Although lasers have been used extensively to help align instruments used in pipe lines, the alignment and mating of pipe sections and the positioning of tubing in pressed ahead directional drilling operations, there is no indication that lasers have been used in the drilling environment where conditions are more hostile to the use of such equipment, i.e. at night, in all kinds of weather, and under wet and/or oily conditions. Secondly, there is a need to provide a means for providing a reference mark on or adjacent to the upper end of the orientation sub that is in precise alignment with the mud motor's bent sub orientations so that the mule-shoe sub's orientation sleeve can be precisely aligned when the string is in a vertical position with the mud motor submerged in mud and/or located below the rig floor.

SUMMARY OF THE INVENTION

A laser alignment tool used in directional drilling operations for aligning and orienting and marking directional and/or logging equipment relative to the setting of an adjustable, bent housing, drilling motor assembly. The tool includes a laser beam transmitter mountable over the scribe line of the drill motor and a laser capture and marking band located adjacent the adjustable orienting sleeve located within the mule shoe orienting sub.

In operation the laser unit is attached externally to the bent housing of the drill motor and aligned parallel with the orienting scribe mark setting of the drill motor. An adjustable capture band, including a photo sensitive film, paper band, or photo sensitive resin paste, is attached or applied directly to the upper potion of the mule shoe or orienting sub adjacent the measuring or logging instrument orienting sleeve. The means for marking also includes a prism or mirror for directing the laser beam through a mask producing an elongated mark onto the photosensitive paste or film.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 1 is a typical assembly view of a drill motor and directional drilling sub assembly with the preferred embodiment of the laser tool in place;

FIG. 2 is a close up view of the drill motor bent housing orientation indicia and laser beam transmitter location FIG. 3 is a frontal view of the laser generator and partial view of its connecting band;

FIG. 4 is a rear view of the laser generator and partial view of its connecting band FIG. 5 is an isometric view of the laser capture flange and connecting means in an unsecured position;

FIG. 6 is an isometric view of the laser capture flange and connecting means in a secured position;

FIG. 7 is an isometric view of the laser capture flange and alternative reflective marker means;

DETAILED DESCRIPTION OF THE PREFERRED EMBODIMENT

Figure 8:
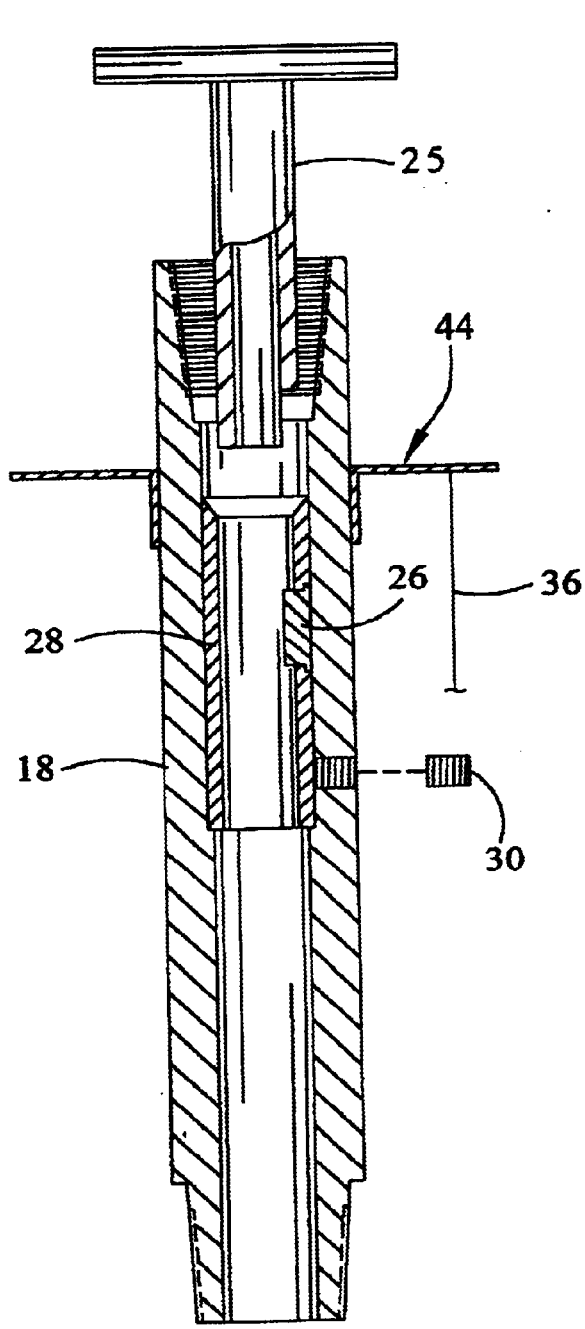
FIG. 8 is a cross section view of the mule shoe orientation sub with rotating tool and laser capture collar.

As seen in FIG. 1, the directional drill string 10 is composed of a drill head sub, a drill motor assembly 14, various other subs as may be required 16, and the mule-shoe orienting sub 18. As emphasized in FIG. 2, the mud motor sub 14 may utilize a bent sub housing 20 for angulation of the drill head 12. Scribe marks 22 are provided externally on the bent sub mud motor housing 20 for setting the orientation of the drill head 12 relative the central axis of the drill string 10. Orientation of electronic measuring equipment located within non-magnetic drill collars 24, seen in FIG. 1 attached to the mule shoe orientation sub 18 must be aligned with the settings indicated by the scribe marks 22 on the mud motor's bent housing 20. This is accomplished, as seen in FIG. 8 by inserting a T-bar tool 25 configured for mating with the key 26 integral with the sleeve 28 set internally within the mule-shoe orienting sub 18 and retained therein by one or more set screws 30.

The instant invention utilizes a battery powered, non-magnifying, illuminated laser beam transmitter 32 securely strapped to the bent housing 20 adjacent the orienting scribe marks 22, as shown in FIG. 2, by a band 34. The laser beam is aligned with the angular setting of the bent housing sub, relative to the central axis of the drill string and parallel to the outside of the housing and projected upwards to ward the mule-shoe sub located several feet away. Various apparatus may be used to align the laser beam 36 with the scribe marks 22, such as a pointer, folded paper, or smoke, etc. Adjustment screws and level indicator 38, as seen in FIG. 3 may be provided on the laser transmitter 32 for positioning the beam 36 for parallel alignment with the outside of the housing 20. The laser housing 40 is a watertight case and contains its own power supply and fitted with a switch 42 for turning the laser on or off. A magnetic strip 43, contour strip and/or I.D. tag may also be provided on the backside of the case 40 as seen in FIG. 4.

The laser beam 36 when switched on is directed upward along the drill string 10 and ultimately captured by a removable target ring 44 as seen in FIG. 5. The target or capture ring 44 may be simply a heavy cardboard ring apparatus folded in a manner whereby when unfolded forms a ring portion 46 and a flange portion 48. The ring portion 46 is secured around the pipe sub 18 by a hook and latch strap or an adhesive strip to form the flanged or target ring element 44 as seen in FIG. 5. The target ring 44, as shown in FIG. 6, is also fitted with a photosensitive paper ring 52 located on the underside of the flange portion and held in place by a peel-off adhesive backing 30. Likewise, a photosensitive paste 54 may be applied to the orienting sub 18 adjacent the capture ring as shown in FIG. 7 in combination with a reflective mirror or prism for directing the laser beam 36 onto the paste 54. In either case, the laser beam striking the photosensitive paper or paste leaves a mark that may be used to more precisely align the keyed sleeve 28 located within the mule shoe sub 18.

Figure 9:
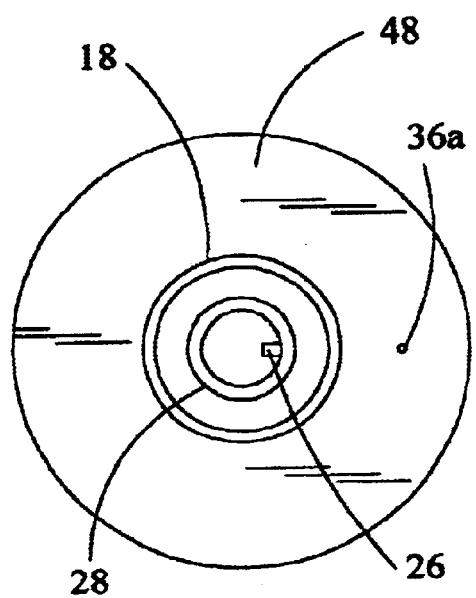
FIG. 9 is a top view of the orientation sub and capture collar seen in FIG. 8.

In use the drill string 10 is brought to the surface of the well until the mule shoe sub is above the drill floor. The capture collar 44 and a fresh photosensitive paper ring 52 or photo sensitive paste 54 is then attached to the mule shoe sub 18 adjacent its upper joint. The drill string 10 is then lifted until the mud motor bent housing clears the drill floor slips where the driller sets the orientation of the mud motors bent sub housing 20. The laser transmitter 32 is then attached and is aligned with the setting indicated by bent housing scribe marks. The laser is then switched on, thereby creating a permanent mark on the paper 52 or paste 54. The laser transmitter may then be switched off and removed from the bent housing and the drill string lowered back into the well until the mule shoe 18 is accessibly located above the drill floor. The slips are set, thereby holding the drill string suspended in the well. The joint above the mule shoe is then uncoupled, thereby providing access to the sleeve 28 located within the central longitudinal bore of the mule shoe 18. As seen in FIG. 8, a hand tool 24 is used to rotatably position the sleeve 28 bringing the key 26 in alignment with the mark 36a seen in FIG. 9 produced by the laser beam 36. The sleeve 28 is then locked in position by tightening set screws 30. Electronic subs may then be replaced or added to the string utilizing the key 26 for orientation alignment. The capture ring 44 is then removed and the drill string is again lowered into the well.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A laser alignment apparatus for assisting in aligning the internal mule-shoe orienting sleeve with bent housing angle settings of a mud motor comprising:
   a) a means for transmitting a laser beam having means for attachment and alignment with angular settings of an adjustable mud motor housing sub; and
   b) a photosensitive marker temporarily attachable to a drill sub located in a drill string remotely from said mud motor bent housing sub, said photosensitive marker located in the path of said laser beam and whereby said laser beam produces a permanent image on said marker.

2. The laser alignment apparatus according to claim 1 wherein said means for transmitting a laser beam is a battery powered laser light encased in a watertight enclosure having an adjustable band attached.

3. The laser alignment apparatus according to claim 1 wherein said means for transmitting a laser beam further comprises a switch and leveling apparatus.

4. The laser alignment apparatus according to claim 1 wherein said photosensitive marker comprises a ring member having a flange portion and means for attaching said ring member securely around a pipe.

5. The laser alignment apparatus according to claim 4 wherein said photo sensitive marker further comprises a detachable photosensitive paper ring adhesively attached to said flange portion.

6. The laser alignment apparatus according to claim 4 wherein said photosensitive marker further comprises a reflector and photosensitive paste.

7. A method for more precisely aligning a mule-shoe orienting sleeve with angular settings on an adjustable mud motor housing comprising the steps of:

a) utilizing a laser beam transmitter attached to an adjustable bent housing mud motor;

b) aligning said laser beam transmitter with the angular setting indicated by scribed marks on the bent housing;

c) securing a target ring adjacent the orienting sleeve of a mule shoe sub;

d) adhering a photosensitive paper target to said target ring;

e) activating said laser beam thereby producing a permanent mark on said paper target; and f) orienting said sleeve with said mark.

8. The method according to claim 7 comprising the step of applying a photosensitive paste externally to said mule-shoe sub adjacent to said target ring and utilizing a reflector to direct said laser beam to said photosensitive paste in a manner whereby said laser beam produces a permanent mark on said photosensitive paste.

* * * * *